United States Patent
Koda

(10) Patent No.: US 11,976,190 B2
(45) Date of Patent: May 7, 2024

(54) BLOCK COPOLYMER, METHOD FOR PRODUCING SAME, RUBBER COMPOSITION USING SAID BLOCK COPOLYMER, AND TIRE

(71) Applicants: KURARAY CO., LTD., Okayama (JP); AMYRIS, INC., Emeryville, CA (US)

(72) Inventor: Daisuke Koda, Kamisu (JP)

(73) Assignees: KURARAY CO., LTD., Okayama (JP); AMYRIS, INC., Emeryville, CA (US)

( * ) Notice: Subject to any disclaimer, the term of this patent is extended or adjusted under 35 U.S.C. 154(b) by 839 days.

(21) Appl. No.: 17/040,829

(22) PCT Filed: Mar. 28, 2019

(86) PCT No.: PCT/JP2019/013598
§ 371 (c)(1),
(2) Date: Sep. 23, 2020

(87) PCT Pub. No.: WO2019/189572
PCT Pub. Date: Oct. 3, 2019

(65) Prior Publication Data
US 2021/0017378 A1    Jan. 21, 2021

(30) Foreign Application Priority Data

Mar. 29, 2018 (JP) ................ 2018-066034

(51) Int. Cl.
| | |
|---|---|
| *B60C 1/00* | (2006.01) |
| *C08F 212/08* | (2006.01) |
| *C08F 236/06* | (2006.01) |
| *C08F 236/22* | (2006.01) |
| *C08F 297/04* | (2006.01) |
| *C08K 3/04* | (2006.01) |
| *C08K 3/36* | (2006.01) |
| *C08K 5/5419* | (2006.01) |
| *C08L 53/02* | (2006.01) |

(52) U.S. Cl.
CPC ............... *C08L 53/02* (2013.01); *B60C 1/00* (2013.01); *C08F 212/08* (2013.01); *C08F 236/06* (2013.01); *C08F 236/22* (2013.01); *C08K 3/04* (2013.01); *C08K 3/36* (2013.01); *C08K 5/5419* (2013.01); *C08F 2438/00* (2013.01)

(58) Field of Classification Search
CPC .... C08F 293/00; C08F 293/005; C08L 53/00; C08L 53/005; C08L 53/02; C08L 53/025
See application file for complete search history.

(56) References Cited

U.S. PATENT DOCUMENTS

| | | |
|---|---|---|
| 2014/0357824 A1 | 12/2014 | Washizu |
| 2015/0197588 A1 | 7/2015 | Uehara et al. |
| 2018/0030194 A1 | 2/2018 | Uehara et al. |
| 2020/0079890 A1 | 3/2020 | Uehara et al. |

FOREIGN PATENT DOCUMENTS

| | | |
|---|---|---|
| CN | 104428320 A | 3/2015 |
| EP | 3 255 073 A1 | 12/2017 |
| JP | 10-36465 A | 2/1998 |
| JP | 2012-502135 A | 1/2012 |
| JP | 2012-502136 A | 1/2012 |
| JP | 2017-14373 A | 1/2017 |
| JP | 2017-14374 A | 1/2017 |
| JP | 2017-214489 A | 12/2017 |
| WO | WO 2013/115010 A1 | 8/2013 |

OTHER PUBLICATIONS

JP2017-014374 machine translation (Year: 2023).*
Extended European Search Repon dated Nov. 2, 2021 in European Patent Application No. 197760127, 6 pages.
International Search Report dated Jun. 11, 2019 in PCT/JP2019/013598 filed on Mar. 28, 2019, 1 page.

* cited by examiner

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

The present invention relates to a block copolymer that contains a polymer block A containing a farnesene-derived monomer unit (a1) and a random copolymer block B containing a C12 or lower conjugated diene-derived monomer unit (b1) and an aromatic vinyl compound-derived monomer unit (b2), the block copolymer having a ratio by mass of the polymer block A to the random copolymer block B (A/B) of 30/70 to 0.5/99.5, a content of the aromatic vinyl compound-derived monomer unit (b2) in the random copolymer block B of 1 to 50% by mass, and a weight average molecular weight (Mw) of 100,000 to 5,000,000.

20 Claims, No Drawings

BLOCK COPOLYMER, METHOD FOR PRODUCING SAME, RUBBER COMPOSITION USING SAID BLOCK COPOLYMER, AND TIRE

CROSS-REFERENCE TO RELATED APPLICATIONS

The present application is the national stage of international application PCT/JP2019/013598, filed on Mar. 28, 2019, and claims the benefit of the filing date of Japanese Appl. No. 2018-066034, tiled on Mar. 29, 2018.

TECHNICAL FIELD

The present invention relates to a block copolymer and a method for producing the same, a rubber composition produced by using the block copolymer, and a tire.

BACKGROUND ART

A polymer obtained by polymerizing a conjugated diene, such as farnesene, exhibits rubber elasticity when crosslinked, and thus a rubber composition containing such a polymer is crosslinked and used as a tire.

For example, PTL 1 discloses, for the purpose of providing a rubber composition for tire that gives improved grip performance and the like, a branched conjugated diene copolymer obtained by copolymerizing a branched conjugated diene compound, such as farnesene, a conjugated diene compound, and a certain vinyl compound, a rubber composition containing the branched conjugated diene copolymer, and a pneumatic tire produced by using the rubber composition.

PTL 2 discloses, for the purpose of improving tensile strength and other properties, a block copolymer containing a polymer block A of a conjugated diene and a random copolymer block B of a conjugated diene and an aromatic vinyl, the block copolymer having a ratio by weight of the polymer block A and the copolymer block B (A:B), an amount of the bonded aromatic vinyl in the copolymer block B, and a weight average molecular weight in specific ranges, and a rubber composition containing the block copolymer and at least one diene rubber.

PTLs 3 and 4 each disclose a polymer of 6-farnesene.

CITATION LIST

Patent Literature

PTL 1: WO 2013/115010
PTL 2: JP H10-36465 A
PTL 3: JP 2012-502135 A
PTL 4: JP 2012-502136 A

SUMMARY OF INVENTION

Technical Problem

However, the rubber composition of PTL 1 is insufficient in fuel economy performance (hereinafter also referred to as "rolling resistance performance") and steering stability at low temperature or on ice or snow roads (hereinafter also referred to as "ice grip performance") of the resulting tire, and further improvement is desired. In PTL 2, neither the rolling resistance performance nor the ice grip performance is considered. Although PTLs 3 and 4 describe polymers of 6-farnesene, practical physical properties are not sufficiently considered.

The present invention is made in view of the above circumstances, and has an object to provide a block copolymer that can provide a tire having high levels of rolling resistance performance and ice grip performance, a method for producing the same, a rubber composition containing the block copolymer, and a tire produced by using the rubber composition.

Solution to Problem

As a result of intensive studies for solving the above problem, the present inventor has found that the above problem can be solved by a block copolymer that contains a polymer block A containing a farnesene-derived monomer unit and a random copolymer block B containing a C12 or lower conjugated diene-derived monomer unit and an aromatic vinyl compound-derived monomer unit, the block copolymer having a ratio by mass of the polymer blocks in a specific range, having a content of the aromatic vinyl compound-derived monomer unit in the random copolymer block B in a specific range, and having a weight average molecular weight as determined by gel permeation chromatography based on polystyrene in a specific range, completing the present invention.

Specifically, the present invention relates to the following [1] to [5].

[1] A block copolymer that contains a polymer block A containing a farnesene-derived monomer unit (a1) and a random copolymer block B containing a C12 or lower conjugated diene-derived monomer unit (b1) and an aromatic vinyl compound-derived monomer unit (b2), the block copolymer having a ratio by mass of the polymer block A to the random copolymer block B (A/B) of 30/70 to 0.5/99.5, a content of the aromatic vinyl compound-derived monomer unit (b2) in the random copolymer block B of 1 to 50% by mass, and a weight average molecular weight (Mw) as determined by gel permeation chromatography based on polystyrene of 100,000 to 5,000,000.

[2] A method for producing a block copolymer that contains a polymer block A containing a farnesene-derived monomer unit (a1) and a random copolymer block B containing a C12 or lower conjugated diene-derived monomer unit (b1) and an aromatic vinyl compound-derived monomer unit (b2), the method including the following Step 1-1 and Step 1-2:

Step 1-1: a step of polymerizing a monomer containing farnesene in the presence of an organic metal initiator to produce a living polymer containing the polymer block A;

Step 1-2: a step of polymerizing monomers containing a C12 or lower conjugated diene and an aromatic vinyl compound in the presence of the living polymer containing the polymer block A obtained in Step 1-1 to produce a living block copolymer containing the polymer block A and the random copolymer block B.

[3] A method for producing a block copolymer that contains a polymer block A containing a farnesene-derived monomer unit (a1) and a random copolymer block B containing a C12 or lower conjugated diene-derived monomer unit (b1) and an aromatic vinyl compound-derived monomer unit (b2), the method including the following Step 2-1 and Step 2-2:

Step 2-1: a step of polymerizing monomers containing a C12 or lower conjugated diene and an aromatic vinyl compound in the presence of an organic metal initiator to produce a living polymer containing the random copolymer block B;

Step 2-2: a step of polymerizing a monomer containing farnesene in the presence of the living polymer containing the random copolymer block B obtained in Step 2-1 to produce a living block copolymer containing the polymer block A and the random copolymer block B.

[4] A rubber composition containing a rubber component (I) containing the block copolymer of [1] and a filler (II), the rubber composition having a content of the block copolymer in the total amount of the rubber component (I) of 0.1 to 99.9% by mass, and containing the filler (II) in an amount of 20 to 150 parts by mass relative to 100 parts by mass of the rubber component (I).

[5] A tire in which the rubber composition of [4] is used in at least a part thereof.

Advantageous Effects of Invention

According to the present invention, a block copolymer that can provide a tire having high levels of rolling resistance performance and ice grip performance, a method for producing the same, a rubber composition containing the block copolymer, and a tire produced by using the rubber composition can be provided.

DESCRIPTION OF EMBODIMENTS

[Block Copolymer]

The block copolymer of the present invention (hereinafter simply referred to as "block copolymer") is a block copolymer that contains a polymer block A containing a farnesene-derived monomer unit (a1) (hereinafter also simply referred to as "farnesene unit (a1)") (hereinafter also simply referred to as "polymer block A") and a random copolymer block B containing a C12 or lower conjugated diene-derived monomer unit (b1) (hereinafter also simply referred to as "conjugated diene unit (b1)") and an aromatic vinyl compound-derived monomer unit (b2) (hereinafter also simply referred to as "aromatic vinyl compound unit (b2)") (hereinafter simply referred to as "copolymer block B"), the block copolymer having a ratio by mass of the polymer block A and the copolymer block B (A/B) of 30/70 to 0.5/99.5, a content of the aromatic vinyl compound-derived monomer unit (b2) in the copolymer block B of 1 to 50% by mass, and a weight average molecular weight (Mw) as determined by gel permeation chromatography based on polystyrene of 100,000 to 5,000,000.

[Polymer Block A]

The polymer block A contains farnesene units (a1).

The farnesene units (a1) may be α-farnesene-derived monomer units, or may be β-farnesene-derived monomer units represented by the following formula (I), or may contain α-farnesene-derived monomer units and 6-farnesene-derived monomer units. From the viewpoint of easy production, the farnesene units (a1) preferably contain β-farnesene-derived monomer units.

From the viewpoint of easy production, the content of the 6-farnesene-derived monomer units in the farnesene units (a1) is preferably 80% by mole or more, more preferably 90% by mole or more, and further preferably, 100% by mole, that is, all of the farnesene units (a1) are 6-farnesene-derived monomer units.

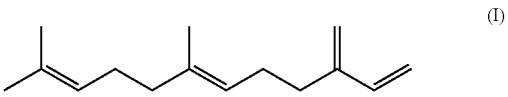

The polymer block A may contain monomer units (a2) derived from a monomer other than farnesene in addition to the farnesene units (a1).

Such a monomer other than farnesene is not particularly limited as long as it can be copolymerized with farnesene, and examples thereof include aromatic vinyl compounds, conjugated dienes other than farnesene, acrylic acid and derivatives thereof, methacrylic acid and derivatives thereof, acrylamide and derivatives thereof, methacrylamide and derivatives thereof, and acrylonitrile.

When the polymer block A contains the monomer units (a2), the bonding form of the sequential arrangement in the polymer block A is not limited and may be any bonding form among random, block, and the like.

Examples of the aromatic vinyl compounds include styrene and styrene derivatives, such as α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, N,N-diethyl-4-aminoethylstyrene, 4-methoxystyrene, monochlorostyrene, and dichlorostyrene; 1-vinylnaphthalene, 2-vinylnaphthalene, vinylanthracene, and vinylpyridine. Among them, styrene and derivatives thereof are preferred, and styrene is more preferred.

As the conjugated diene, a C12 or lower conjugated diene other than farnesene is preferred, and examples thereof include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, and chloroprene. Among them, butadiene, isoprene, and myrcene are preferred, and butadiene is more preferred.

Examples of the acrylic acid derivatives include methyl acrylate, ethyl acrylate, n-butyl acrylate, isobutyl acrylate, t-butyl acrylate, 2-ethylhexyl acrylate, isooctyl acrylate, isononyl acrylate, lauryl acrylate, stearyl acrylate, cyclohexyl acrylate, isobornyl acrylate, dicyclopentenyloxyethyl acrylate, tetraethylene glycol acrylate, tripropylene glycol acrylate, 4-hydroxybutyl acrylate, 3-hydroxy-1-adamantyl acrylate, tetrahydrofurfuryl acrylate, methoxyethyl acrylate, and N,N-dimethylaminoethyl acrylate.

Examples of the methacrylic acid derivatives include methyl methacrylate, ethyl methacrylate, n-butyl methacrylate, isobutyl methacrylate, t-butyl methacrylate, 2-ethylhexyl methacrylate, lauryl methacrylate, tridecyl methacrylate, stearyl methacrylate, cyclohexyl methacrylate, isobornyl methacrylate, dicyclopentanyl methacrylate, benzyl methacrylate, dicyclopentenyloxyethyl methacrylate, 2-hydroxyethyl methacrylate, 2-hydroxypropyl methacrylate, 3-hydroxy-1-adamantyl methacrylate, tetrahydrofurfuryl methacrylate, dimethylaminoethyl methacrylate, diethylaminoethyl methacrylate, glycidyl methacrylate, and methacrylamide.

Examples of the acrylamide derivatives include dimethylacrylamide, acryloylmorpholine, isopropylacrylamide, diethylacrylamide, dimethylaminopropylacrylamide, dimethylaminopropylacrylamide methyl chloride quaternary salt, hydroxyethylacrylamide, and 2-acrylamide-2-methylpropanesulfonic acid.

Examples of the methacrylamide derivatives include dimethylmethacrylamide, methacryloylmorpholine, isopropylmethacrylamide, diethylmethacrylamide, dimethylaminopropylmethacrylamide, and hydroxyethylmethacrylamide.

One of such other monomers may be used alone or two or more thereof may be used in combination.

The content of the farnesene units (a1) in the polymer block A is preferably 60% by mass or more, and from the viewpoints of the rolling resistance performance and ice grip performance, the content is more preferably in the range of 60 to 100% by mass, further preferably 70 to 100% by mass, furthermore preferably 80 to 100% by mass, particularly preferably 90 to 100% by mass, and is most preferably 100% by mass.

The content of the farnesene units (a1) in the total amount of the monomer units that constitute the block copolymer is preferably in the range of 0.1 to 30% by mass, more preferably 0.3 to 25% by mass, further preferably 0.5 to 20% by mass, furthermore preferably 0.7 to 15% by mass, and particularly preferably 0.9 to 10% by mass. When the content of the farnesene units (a1) is in the above range, the rolling resistance performance and ice grip performance can be increased. In addition, when a silica is used as a filler (II) which is described later, the mobility of the block copolymer chains is suppressed by the interaction between the farnesene unit (a1) contained in the block copolymer and the silica, and the rolling resistance performance and braking performance on wet roads (hereinafter also referred to as "wet grip performance") can presumably be improved in a good balance.

The content of the farnesene units (a1) in the total amount of the monomer units constituting the block copolymer can be measured by a method using 1H-NMR.

[Random Copolymer Block B]

The copolymer block B contains C12 or lower conjugated diene-derived monomer units (b1) (conjugated diene units (b1)) and aromatic vinyl compound-derived monomer units (b2) (aromatic vinyl compound units (b2)), and the monomer units constituting the copolymer block B form bonds randomly.

Examples of the C12 or lower conjugated diene constituting the conjugated diene unit (b1) include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, and chloroprene. Among them, butadiene, isoprene, and myrcene are preferred, and butadiene is more preferred. One of such conjugated dienes may be used alone or two or more thereof may be used in combination.

Examples of the aromatic vinyl compound constituting the aromatic vinyl compound unit (b2) include the same examples as for the aromatic vinyl compound constituting the monomer unit (a2). Among them, styrene and derivatives thereof are preferred, and styrene is more preferred.

In addition to the conjugated diene units (b1) and the aromatic vinyl compound units (b2), the copolymer block B may further contain units derived from a monomer other than either C12 or lower conjugated dienes or aromatic vinyl compounds. Such another monomer is not particularly limited as long as it can be copolymerized with a C12 or lower conjugated diene and an aromatic vinyl compound, and examples thereof include acrylic acid and derivatives thereof, methacrylic acid and derivatives thereof, acrylamide and derivatives thereof, methacrylamide and derivatives thereof, and acrylonitrile, as described above.

The block copolymer may contain a polymer block C other than either the polymer block A or the copolymer block B to the extent that the effects of the present invention are not impaired.

As the polymer block C, a polymer block constituted only of a C12 or lower conjugated diene, a polymer block containing a C12 or lower conjugated diene-derived monomer unit and a monomer unit other than aromatic vinyl compounds, and the like are exemplified.

As a combination of the conjugated diene unit (b1) and the aromatic vinyl compound unit (b2) which constitute the copolymer block B, from the viewpoints of the rolling resistance performance and ice grip performance, a combination of a monomer unit derived from one or more selected from butadiene, isoprene, and myrcene and a monomer unit derived from one or more selected from styrene and derivatives thereof is preferred, and a combination of a monomer unit derived from butadiene and a monomer unit derived from styrene is more preferred.

The content of the aromatic vinyl compound units (b2) in the copolymer block B is 1 to 50% by mass. Within the above range, a block copolymer that provides a tire having high levels of rolling resistance performance and ice grip performance can be obtained. From this point of view, the content of the aromatic vinyl compound units (b2) in the copolymer block B is preferably in the range of 3 to 50% by mass, more preferably 5 to 48% by mass, further preferably 10 to 45% by mass, and furthermore preferably 15 to 43% by mass.

From the viewpoints of the rolling resistance performance and ice grip performance, the ratio by mass of the aromatic vinyl compound units (b2) to the conjugated diene units (b1) [(b2)/(b1)] in the copolymer block B is preferably 3/97 to 50/50, more preferably 5/95 to 48/52, further preferably 10/90 to 45/55, and furthermore preferably 15/85 to 43/57.

The total content of the conjugated diene units (b1) and the aromatic vinyl compound units (b2) in the copolymer block B is preferably 60% by mass or more. From the viewpoints of the rolling resistance performance and ice grip performance, the total content is more preferably in the range of 60 to 100% by mass, further preferably 70 to 100% by mass, furthermore preferably 80 to 100% by mass, particularly preferably 90 to 100% by mass, and is most preferably 100% by mass.

The weight average molecular weight (Mw) of the block copolymer is 100,000 to 5,000,000. Within the above range, a block copolymer that provides a tire having high levels of rolling resistance performance and ice grip performance can be obtained. From this point of view, Mw is preferably 300,000 to 3,000,000, more preferably 500,000 to 2,000,000, and further preferably 700,000 to 1,500,000.

The weight average molecular weight (Mw) in the present invention is a weight average molecular weight determined by gel permeation chromatography (GPC) based on polystyrene by a method described later in Examples.

The glass transition temperature (Tg) of the block copolymer as determined by differential thermal analysis varies by the bonding form (micro structure) and the respective contents of the monomer units, but is preferably −90 to −10° C., more preferably −80 to −20° C., further preferably −75 to −26° C. Within a glass transition temperature in the above range, the rolling resistance performance and ice grip performance are increased.

The glass transition temperature in the present invention is determined by a method described later in Examples.

The ratio by mass of the polymer blocks A to the copolymer blocks B (A/B) in the block copolymer is 30/70 to 0.5/99.5. Within the above range, a block copolymer that provides a tire having high levels of rolling resistance performance and ice grip performance can be obtained. From this point of view, the ratio by mass (A/B) is preferably 25/75 to 0.5/99.5, more preferably 23/77 to 0.7/99.3, and further preferably 20/80 to 0.7/99.3. From the viewpoint of increasing the wet grip performance in addition to the rolling resistance performance and ice grip performance, the ratio by mass is furthermore preferably 15/85 to 0.7/99.3, and particularly preferably 10/90 to 1/99.

From the viewpoint of the rolling resistance performance and ice grip performance, the total content of the polymer blocks A and the copolymer blocks B in the block copolymer is preferably 80 to 100% by mass, more preferably 90 to 100% by mass, further preferably 95 to 100% by mass, and furthermore preferably 98 to 100% by mass.

In the block copolymer of the present invention, the bonding form of the polymer blocks A and the copolymer blocks B is not particularly limited, and may be a linear form, branched form, radial form, or combinations of two or more thereof.

In the following description, the block copolymer of the present invention that has a linear form is referred to as a "linear block copolymer", and the block copolymer that has a branched form is referred to as a "branched block copolymer".

For example, an example of a form in which the block copolymer is constituted of the polymer blocks A and the copolymer blocks B which are bonded linearly is a linear block copolymer represented by $(A-B)_p$, $A-(B-A)_q$, or $B-(A-B)_r$, wherein A represents the polymer block A and B represents the copolymer block B.

In addition, an example of a form in which the block copolymer is constituted of the polymer blocks A, the copolymer blocks B, and the polymer blocks C which are bonded linearly is a linear block copolymer represented by $(A-B-C)_s$.

The p, q, r, and s each independently represent an integer of 1 or larger.

In addition, when the block copolymer has two or more polymer blocks A or two or more copolymer blocks B, the polymer blocks may be the same or different. For example, as long as two polymer blocks A in a triblock copolymer represented by A-B-A contain the farnesene unit (a1), the contents of the farnesene units (a1) in the two blocks A, the structures thereof, such as the kinds and the contents of other monomer units, and the molecular weights thereof may be the same or different.

From the viewpoint of the rolling resistance performance, at least a part of the block copolymer preferably has a structure in which terminals of linear block copolymer chains are bonded to one another via a coupling agent as represented by the following formula (II). Thus, the molecular weight of the block copolymer can be increased.

$$(P)_n X \qquad\qquad (II)$$

(In the formula (II), P represents a linear block copolymer chain, X represents a coupling agent residue, and n represents an integer of 2 or more.)

Here, the linear block copolymer chain represented by P is configured in the same manner as for the block copolymer described above. That is, the kinds and contents of the monomers constituting the polymer blocks constituting a linear block copolymer chain, the contents of the polymer blocks in the block copolymer chain, and the like are as described above.

In this description, when polymer blocks of the same kind are bonded linearly via a two-functional coupling agent or the like, the bonded polymer blocks are taken as separate polymer blocks. For example, a block copolymer containing the coupling agent residue X is represented by, for example, B-A-X-A-B or $(B-A)_2X$. In this case, P in the formula (II) is a linear block copolymer chain represented by B-A.

The number of the functional groups of the coupling agent is preferably 2 to 6, more preferably 3 to 4, and further preferably 4.

Examples of the coupling agent include: alkoxysilane compounds, such as diethoxydimethylsilane, trimethoxymethylsilane, triethoxymethylsilane, tetramethoxysilane, tetraethoxysilane, tetrabutoxysilane, tetrakis(2-ethylhexyloxy)silane, bis(triethoxysilyl)ethane, and 3-aminopropyltriethoxysilane; divinylbenzene; polyvalent epoxy compounds, such as epoxidated 1,2-polybutadiene, epoxidated soy bean oil, and tetraglycidyl-1,3-bisaminomethylcyclohexane; halogenated compounds, such as tin tetrachloride, tetrachlorosilane, trichlorosilane, trichloromethylsilane, dichlorodimethylsilane, and dibromodimethylsilane; ester compounds, such as methyl benzoate, ethyl benzoate, phenyl benzoate, diethyl oxalate, diethyl malonate, diethyl adipate, dimethyl phthalate, and dimethyl terephthalate; carbonate ester compounds, such as dimethyl carbonate, diethyl carbonate, and diphenyl carbonate; and 2,4-tolylene diisocyanate. Among them, alkoxysilane compounds are preferred. By using an alkoxysilane compound as a coupling agent, when a silica is used as a filler (II) which is described later, the mobility of the block copolymer chains is suppressed by the interaction between the coupling agent residue in the block copolymer and the silica, and the rolling resistance performance and wet grip performance are presumably increased in a good balance. From this point of view, tetraethoxysilane is more preferred.

The block copolymer is preferably a mixture of block copolymers coupled via a coupling agent (hereinafter also referred to as a "coupled block copolymer") and a block copolymer not coupled via a coupling agent (hereinafter also referred to as a "non-coupled block copolymer").

As used herein, the term "coupled block copolymer" means a block copolymer in which two or more linear block copolymer chains are bonded via a coupling agent, that is, a block copolymer of the formula (II) wherein n is 2 or more.

The coupling ratio which is a ratio of the coupled block copolymer relative to the total amount of the coupled block copolymer and the non-coupled block copolymer (hereinafter also referred to as "coupling ratio") is preferably 40% by mass or less. From the viewpoint of the rolling resistance performance, the coupling ratio is more preferably 1 to 40% by mass, further preferably 1 to 30% by mass, furthermore preferably 5 to 28% by mass, and particularly preferably 10 to 25% by mass.

The coupling ratio is calculated, based on an elution curve obtained by gel permeation chromatography (GPC) of the block copolymer, by dividing the area of the coupled block copolymer(s) (the area of the peak(s) on the high molecular weight side) by the sum of the area of the coupled block copolymer and the area of the non-coupled block copolymer (the area of the peak on the low molecular weight side).

The elution curve of the block copolymer after the coupling reaction preferably has a shape in which a peak of the non-coupled block copolymer is detected on the low molecular weight side and a single peak or a group of multiple peaks of a dimer, a trimer, a tetramer, or the like which is the coupled block copolymer is detected on the high molecular weight side. With the peak of the non-coupled block copolymer called a peak 1 and a single peak or a group of multiple peaks of the coupled block copolymer(s) called a peak 2, when the peak 1 and the peak 2 partially overlap, the area surrounded by the peak 1, the baseline of the entire elution curve, and a line that is perpendicular to the baseline and that passes through the bottom point of the valley between the peaks is taken as the area of the non-coupled block copolymer, and the area surrounded by the peak 2, the baseline, and the perpendicular line is taken as the area of the coupled block copolymer(s), thereby calculating the coupling ratio.

The coupling ratio can be adjusted by the amount of the coupling agent added, the reaction temperature, the reaction time, and the like.

From the viewpoint of the rolling resistance performance, at least a part of the block copolymer is preferably a branched block copolymer in which terminals of linear block copolymer chains are bonded to one another via a coupling agent. The branched block copolymer means the formula (II) wherein n is 3 or more.

From the viewpoint of the rolling resistance performance and wet grip performance, the block copolymer preferably has the polymer block A at a terminal of the molecular chain.

As used in the present invention, the "terminal of the molecular chain" means a terminal of the block copolymer chain, and in the case of the branched block copolymer, it means at least one of the two terminals of the arm chains. The arm chain is the linear block copolymer chain P in the formula (II).

Farnesene which constitutes the polymer block A is a conjugated diene monomer having a side chain. Thus, in the case where the polymer block A is present at a terminal of the molecular chain, a farnesene-derived side chain having an appropriate size can be introduced into a terminal of the molecular chain of the block copolymer, thereby suppressing entanglement of the polymer chains. Furthermore, interaction with the filler (II) itself used in the rubber composition which is described later or with a coupling agent bonded on the filler (II) can be strengthened. As a result, the rolling resistance performance and wet grip performance can be improved in a good balance.

In the block copolymer, from the viewpoint of the rolling resistance performance and ice grip performance, at least a part of the block copolymer is a branched block copolymer in which terminals of linear block copolymer chains are bonded to one another via a coupling agent and in which the arm chain (the linear block copolymer chain P in the formula (II)) is preferably an AB-type diblock copolymer in which the polymer block A and the copolymer block B are bonded in this order, or an ABC-type triblock copolymer in which the polymer block A, the copolymer block B, and the polymer block C are bonded in this order. From the viewpoint of increasing the rolling resistance performance, ice grip performance, and wet grip performance in a good balance, the branched block copolymer is more preferably one or more selected from a 3-branched or 4-branched block copolymer represented by $(A-B)_3-X$, $(B-A)_3-X$, $(A-B)_4-X$, or $(B-A)_4-X$ having AB-type diblock copolymers as arm chains, and a 3-branched or 4-branched block copolymer represented by $(A-B-C)_3-X$ or $(A-B-C)_4-X$ having triblock copolymers as arm chains. From the viewpoint of increasing the processability and the mechanical strength of the rubber composition in a good balance, a 3-branched block copolymer is further preferred.

Preferred embodiments of the polymer block A and the copolymer block B in the branched block copolymer are as described above.

[Method for Producing Block Copolymer]

The production method of the present invention is a method for producing a block copolymer that contains a polymer block A containing a farnesene-derived monomer unit (a1) and a random copolymer block B containing a C12 or lower conjugated diene-derived monomer unit (b1) and an aromatic vinyl compound-derived monomer unit (b2).

In the production method of the present invention, the order of forming the polymer blocks is not particularly limited. Examples of the method include a method in which a monomer containing farnesene is first supplied to a reaction system to form the polymer block A, and then monomers containing a C12 or lower conjugated diene and an aromatic vinyl compound are supplied thereto to form the copolymer block B, and a method in which monomers containing a C12 or lower conjugated diene and an aromatic vinyl compound are supplied to a reaction system to form the copolymer block B, and then a monomer containing farnesene is supplied thereto to form the polymer block A. When the block copolymer contains a polymer block C other than either the polymer block A or the copolymer block B, a step of forming the polymer block C can be included before or after any of the steps of forming the polymer block A and the copolymer block B.

The production method of the present invention is preferably a living polymerization method. As the living polymerization method, a known method, such as living anionic polymerization, living cationic polymerization, or living radical polymerization, can be applied. Among them, a living anionic polymerization method is preferred. In a living anionic polymerization method, in the presence of a solvent and an organic metal initiator, and a Lewis base as required, polymer blocks having desired block structures and molecular weights are formed from farnesene, a C12 or lower conjugated diene, and an aromatic vinyl compound, and another monomer as required, whereby a block copolymer can be obtained.

From the viewpoint of the rolling resistance performance and ice grip performance, the production method of the present invention is preferably a method (i) including the following Step 1-1 and Step 1-2, or a method (ii) including the following Step 2-1 and 2-2.

(Method (i))

Step 1-1: a step of polymerizing a monomer containing farnesene in the presence of an organic metal initiator to produce a living polymer containing the polymer block A Step 1-2: a step of polymerizing monomers containing a C12 or lower conjugated diene and an aromatic vinyl compound in the presence of the living polymer containing the polymer block A obtained in Step 1-1 to produce a living block copolymer containing the polymer block A and the copolymer block B In the method (i), when the block copolymer contains a polymer block C other than either the polymer block A or the copolymer block B, the method (i) can include a step of forming the polymer block C in either step of Step 1-1 or Step 1-2.

For example, in Step 1-1, a monomer constituting the polymer block C may be polymerized to produce a living polymer containing the polymer block A and the polymer block C. Alternatively, in Step 1-2, a monomer constituting the polymer block C may be polymerized to produce a living block copolymer containing the polymer block A, the copolymer block B, and the polymer block C.

From the viewpoint of obtaining the block copolymer having the polymer block A at a terminal of the molecular chain in Step 1-1, the polymer block A is preferably formed first.

(Method (ii))

Step 2-1: a step of polymerizing monomers containing a C12 or lower conjugated diene and an aromatic vinyl compound in the presence of an organic metal initiator to produce a living polymer containing the copolymer block B Step 2-2: a step of polymerizing a monomer containing farnesene in the presence of the living polymer containing the copolymer block B obtained in Step 2-1 to produce a living block copolymer containing the polymer block A and the copolymer block B In the method (ii), when the block copolymer contains a polymer block C other than either the polymer block A or the copolymer block B, a step of forming the polymer block C may be included in either step of Step 2-1 or Step 2-2.

For example, in Step 2-1, a monomer constituting the polymer block C may be polymerized to produce a living polymer containing the copolymer block B and the polymer block C. Alternatively, in Step 2-2, a monomer constituting the polymer block C may be polymerized to produce a living block copolymer containing the polymer block A, the copolymer block B, and the polymer block C.

In Step 2-2, from the viewpoint of obtaining the block copolymer having the polymer block A at a terminal of the molecular chain, the polymer block A is preferably formed lastly.

In the method (i) and method (ii), the kinds and contents of the monomers constituting the polymer blocks, the contents of the polymer blocks in the block copolymer, and the like are as described above.

Examples of the active metal used as the organic metal initiator include: alkali metals, such as lithium, sodium, and potassium; Group 2 elements, such as beryllium, magnesium, calcium, strontium, and barium; and lanthanoid rare earth metals, such as lanthanum and neodymium. Among them, one or more selected from alkali metals and Group 2 elements are preferred, and an alkali metal is more preferred. As an organic metal initiator, an organic alkali metal compound is preferred.

Examples of the organic alkali metal compound include organic lithium compounds, such as methyllithium, ethyllithium, n-butyllithium, sec-butyllithium, t-butyllithium, hexyllithium, phenyllithium, stilbenelithium, dilithiomethane, dilithionaphthalene, 1,4-dilithiobutane, 1,4-dilithio-2-ethylcyclohexane, and 1,3,5-trilithiobenzene; sodium naphthalenide, and potassium naphthalenide. Among them, an organic lithium compound is preferred, and an organic monolithium compound is more preferred. Note that such an organic alkali metal compound may be reacted with a secondary amine, such as diisopropylamine, dibutylamine, dihexylamine, or dibenzylamine, to produce an organic alkali metal amide to be used as an organic metal initiator.

The amount of the organic metal initiator used in the polymerization is appropriately determined by the molecular weight of the block copolymer, and is preferably in the range of 0.001 to 0.3% by mass relative to the total amount of the monomers constituting the block copolymer.

The solvent is not particularly limited as long as it has no adverse effect on the anionic polymerization reaction, and examples thereof include: saturated aliphatic hydrocarbons, such as n-pentane, isopentane, n-hexane, n-heptane, and isooctane; saturated alicyclic hydrocarbons, such as cyclopentane, cyclohexane, and methylcyclopentane; and aromatic hydrocarbons, such as benzene, toluene, and xylene. One of such solvents may be used alone or two or more thereof may be used in combination. The amount of the solvent used is not particularly limited.

Lewis bases play a roll of controlling the micro structure of a farnesene unit and a monomer unit derived from a conjugated diene other than farnesene. Examples of Lewis bases include: ether compounds, such as dibutyl ether, diethyl ether, tetrahydrofuran, dioxane, and ethylene glycol diethyl ether; pyridine; tertiary amines, such as N,N,N',N'-tetramethylethylenediamine and trimethylamine; an alkali metal alkoxide, such as potassium t-butoxide; and phosphine compounds. When a Lewis base is used, the amount thereof is usually preferably in the range of 0.01 to 1,000 molar equivalent relative to one mole of the organic metal initiator.

The temperature of the polymerization reaction is typically in the range of −80 to 150° C., preferably 0 to 100° C., and more preferably 10 to 90° C. The type of the polymerization reaction may be batch type or continuous type.

The polymerization reaction can be terminated by addition of an alcohol, such as methanol or isopropanol, as a polymerization terminator. The obtained polymerization reaction liquid is poured into a poor solvent, such as methanol, to precipitate the block copolymer, or the polymerization reaction liquid is washed with water as needed, and after separation, the solvent is evaporated by steam stripping or the like and the residue is dried, whereby the block copolymer can be isolated. Alternatively, the polymerization solution is mixed with an extender oil in advance before removal of the solvent to collect the product as an oil extended rubber.

In the method (i) and method (ii), the reaction at the active terminals of the living block copolymer obtained in Step 1-2 and Step 2-2 may be terminated by addition of the polymerization terminator as described above, but preferably, Step 1-3 of coupling at least a part of the active terminals of the living block copolymer obtained in Step 1-2 via a coupling agent, or Step 2-3 of coupling at least a part of the active terminals of the living block copolymer obtained in Step 2-2 via a coupling agent is further carried out.

A preferred coupling agent and coupling ratio are as described above.

By Step 1-3 or Step 2-3, the molecular weight of the obtained block copolymer can be increased and the rolling resistance performance can be enhanced.

In Step 1-3 and Step 2-3, the weight average molecular weight (Mw) of the living block copolymer to be subjected to the coupling reaction is preferably 50,000 to 3,000,000, more preferably 100,000 to 2,000,000, further preferably 200,000 to 1,000,000. The molecular weight distribution (Mw/Mn) in the living block copolymer is preferably 1.0 to 2.0, more preferably 1.0 to 1.6, and further preferably 1.0 to 1.3. When Mw/Mn is in the above range, the block copolymer obtained after coupling has block copolymer chains each having a narrow molecular weight distribution.

The weight average molecular weight and molecular weight distribution of the present invention are determined by gel permeation chromatography (GPC) based on polystyrene by a method described later in Examples.

[Rubber Composition]

The rubber composition of the present invention is a rubber composition that contains a rubber component (I) containing the block copolymer and a filler (II), the rubber composition having a content of the block copolymer in the total amount of the rubber component (I) of 0.1 to 99.9% by mass and containing the filler (II) in an amount of 20 to 150 parts by mass relative to 100 parts by mass of the rubber component (I).

<Rubber Component (I)>.

The rubber component (I) contains the block copolymer, and the content of the block copolymer in the total amount of the rubber component (I) is 0.1 to 99.9% by mass. Thus, the rolling resistance performance and ice grip performance are enhanced.

From the viewpoint of the rolling resistance performance and ice grip performance, the content of the block copolymer in the total amount of the rubber component (I) is preferably 0.5 to 95% by mass, more preferably 1 to 90% by mass, and further preferably 5 to 85% by mass.

Examples of the rubber component other than the block copolymer contained in the rubber component (I) include: natural rubbers; and synthetic rubbers, such as a styrene butadiene rubber (hereinafter referred to as "SBR"), a butadiene rubber, an isoprene rubber, a butyl rubber, a halogenated butyl rubber, an ethylene propylene rubber (EPM), an ethylene propylene diene rubber (EMDM), a butadiene acrylonitrile copolymer rubber, and a chloroprene rubber. Among them, from the viewpoint of rolling resistance performance and ice grip performance, one or more selected from natural rubbers and synthetic rubbers, such as an SBR, a butadiene rubber, and an isoprene rubber, are preferred. One of such other rubber components may be used alone or two or more thereof may be used in combination.

From the viewpoint of the rolling resistance performance and ice grip performance, the content of the rubber components other than the block copolymer is 0.1 to 99.9% by mass in the total amount of the rubber component (I), preferably 5 to 99.5% by mass, more preferably 10 to 99% by mass, and further preferably 15 to 95% by mass.

[Natural Rubber]

Examples of the natural rubber to be used in the rubber component (I) include: natural rubbers generally used in the tire industry, for example, TSR (technically specified rubber), such as SMR (TSR from Malaysia), SIR (TSR from Indonesia), or STR (TSR from Thailand), and RSS (ribbed smoked sheet); modified natural rubbers, such as high purity natural rubbers, epoxidated natural rubbers, hydroxylated natural rubbers, hydrogenated natural rubbers, and grafted natural rubbers. Among them, from the viewpoint of less variation in quality and availability, SMR20, STR20, or RSS #3 is preferred. One of such natural rubbers may be used alone or two or more thereof may be used in combination. When two or more natural rubbers are used in mixture, any combination can be selected to the extent that the effects of the present invention are not impaired, and the physical properties can be controlled by the combination.

[Synthetic Rubber]

When two or more synthetic rubbers to be used in the rubber component (I) are used in mixture, any combination can be selected to the extent that the effects of the present invention are not impaired, and the physical properties can be controlled by the combination. The production method is not particularly limited, and a commercially available one can be used.

(SBR)

As the SBR, general SBR's used in tire application can be used, but specifically, an SBR having a styrene content of 0.1 to 70% by mass is preferred, and 5 to 50% by mass is more preferred. In addition, an SBR having a vinyl content of 0.1 to 60% by mass is preferred, and 0.1 to 55% by mass is more preferred.

The weight average molecular weight (Mw) of the SBR is, from the viewpoint of the moldability, mechanical strength, abrasion resistance, and braking performance, preferably 100,000 to 2,500,000, more preferably 150,000 to 2,000,000, and further preferably 200,000 to 1,500,000.

The glass transition temperature (Tg) of the SBR to be used in the present invention as determined by differential thermal analysis is preferably −95 to 0° C., more preferably −95 to −5° C. When the Tg is within the above range, increase in the viscosity of the rubber composition can be suppressed, enabling easy handling.

The SBR usable in the present invention is produced by copolymerizing styrene and butadiene. The production method of the SBR is not particularly limited, and any of an emulsion polymerization method, a solution polymerization method, a gas phase polymerization method, and a bulk polymerization method can be used, and an emulsion polymerization method and a solution polymerization method are preferred.

An emulsion polymerization styrene butadiene rubber (hereinafter also referred to as "E-SBR") can be produced by a typical emulsion polymerization method, and, for example, can be obtained by emulsifying and dispersing prescribed amounts of styrene and butadiene monomers in the presence of an emulsifier, which is subjected to emulsion polymerization with a radical polymerization initiator. A chain transfer agent can be used to adjust the molecular weight of the obtained E-SBR. After termination of the polymerization reaction, unreacted monomers are removed from the obtained latex as needed, and then, a salt, such as sodium chloride, calcium chloride, or potassium chloride, is used as a coagulant to coagulate the copolymer while adjusting the pH of the coagulated system into a prescribed value, as needed, by addition of an acid, such as nitric acid or sulfuric acid, and then the dispersion solvent is separated, whereby the copolymer can be collected as crumb. The crumb is washed with water, then dehydrated, and then dried with a band dryer or the like, thereby obtaining E-SBR.

A solution polymerization styrene butadiene rubber (hereinafter also referred to as "S-SBR") can be produced by a typical solution polymerization method, and for example, can be produced by polymerizing styrene and butadiene using an anionic-polymerizable active metal in a solvent, in the presence of a polar compound, as needed. As the anionic-polymerizable active metal, an alkali metal and an alkaline earth metal are preferred, and an alkali metal is more preferred, and an organic alkali metal compound is further preferred.

Examples of the organic alkali metal compound include: organic monolithium compounds, such as n-butyllithium, sec-butyllithium, t-butyllithium, hexyllithium, phenyllithium, and stilbenelithium; polyfunctional organic lithium compounds, such as dilithiomethane, 1,4-dilithiobutane, 1,4-dilithio-2-ethylcyclohexane, and 1,3,5-trilithiobenzene; and sodium naphthalenide and potassium naphthalenide. Among them, an organic lithium compound is preferred, and an organic monolithium compound is more preferred. The amount of the organic alkali metal compound used can be appropriately determined depending on the molecular weight of the desired S-SBR.

Examples of the solvent include: aliphatic hydrocarbons, such as n-butane, n-pentane, isopentane, n-hexane, n-heptane, and isooctane; alicyclic hydrocarbons, such as cyclopentane, cyclohexane, and methylcyclopentane; and aromatic hydrocarbons, such as benzene and toluene. The solvent is usually preferably used at a monomer concentration in the range of 1 to 50% by mass.

The polar compound is not particularly limited as long as it does not deactivate the reaction in the anionic polymerization, and it is typically used for controlling the micro structure of a butadiene moiety or the distribution of styrene in a copolymer chain. Examples thereof include; ether compounds, such as dibutyl ether, tetrahydrofuran, and ethylene glycol diethyl ether; tertiary amines, such as tetramethylethylenediamine and trimethylamine; alkali metal alkoxides; and phosphine compounds.

The temperature of polymerization reaction is usually in the range of −80 to 150° C., preferably 0 to 100° C., and more preferably 30 to 90° C. The type of polymerization may be either of batch type or continuous type. The polymerization reaction can be terminated by addition of an alcohol, such as methanol or isopropanol, as a polymerization terminator. A polymerization terminal modifier may be added before addition of the polymerization terminator. The solvent can be separated from the polymerization solution after termination of the polymerization reaction by, for example, direct drying or steam stripping to collect the target S-SBR. The polymerization solution may be mixed with an extender oil in advance before removal of the solvent to collect the product as an oil extended rubber.

In the present invention, a modified SBR in which a functional group is introduced into an SBR can be used to the extent that the effects of the present invention are not impaired. Examples of the functional group include an amino group, an alkoxysilyl group, a hydroxy group, an epoxy group, and a carboxy group. In the modified SBR, the site in the polymer at which the functional group is introduced may be a terminal of the polymer or may be a side chain of the polymer.

(Butadiene Rubber)

As the butadiene rubber, for example, a commercially available butadiene rubber obtained by polymerization using a Ziegler catalyst, a lanthanoid rare earth metal catalyst, an organic alkali metal compound, or the like can be used. Among them, from the viewpoint of the high cis content, a butadiene rubber obtained by polymerization using a Ziegler catalyst is preferred. Alternatively, a butadiene rubber having a super high cis content obtained using a Lanthanoid rare earth metal catalyst may be used.

The vinyl content in the butadiene rubber is preferably 50% by mass or less, more preferably 40% by mass or less, and further preferably 30% by mass or less. When the vinyl content is 50% by mass or less, the rolling resistance performance is good. The lower limit of the vinyl content is not particularly limited.

The glass transition temperature (Tg) of the butadiene rubber varies depending on the vinyl content, and is preferably −40° C. or lower, and more preferably −50° C. or lower.

The weight average molecular weight (Mw) of the butadiene rubber is, from the viewpoint of moldability, mechanical strength, abrasion resistance, and braking performance, preferably 90,000 to 2,000,000, more preferably 150,000 to 1,500,000, and further preferably 250,000 to 800,000.

The butadiene rubber may have a branched structure or a polar functional group through the use of a modifier, such as an alkoxysilane a part of which has a polyfunctional modifier, such as tin tetrachloride, silicon tetrachloride, or an epoxy group, in the molecule, or an amino group-containing alkoxysilane.

(Isoprene Rubber)

As the isoprene rubber, for example, a commercially available isoprene rubber obtained by polymerization using a Ziegler catalyst, a lanthanoid rare earth metal catalyst, an organic alkali metal compound, or the like can be used. Among them, from the viewpoint of the high cis content, an isoprene rubber obtained by polymerization using a Ziegler catalyst is preferred. Alternatively, an isoprene rubber having a super high cis content obtained using a lanthanoid rare earth metal catalyst may be used.

The vinyl content of the isoprene rubber is preferably 50% by mass or less, more preferably 40% by mass or less, and further preferably 30% by mass or less. When the vinyl content is 50% by mass or less, the rolling resistance performance is good. The lower limit of the vinyl content is not particularly limited.

The glass transition temperature (Tg) of the isoprene rubber varies depending on the vinyl content, and is preferably −20° C. or lower, and more preferably −30° C. or lower.

The weight average molecular weight (Mw) of the isoprene rubber is, from the viewpoint of moldability, mechanical strength, abrasion resistance, and braking performance, preferably 90,000 to 2,000,000, and more preferably 150,000 to 1,500,000.

The isoprene rubber may have a branched structure or a polar functional group through the use of a modifier, such as an alkoxysilane a part of which has a polyfunctional modifier, such as tin tetrachloride, silicon tetrachloride, or an epoxy group, in the molecule, or an amino group-containing alkoxysilane.

<Filler (II)>

The rubber composition of the present invention contains a filler (II) in an amount of 20 to 150 parts by mass relative to 100 parts by mass of the rubber component (I). By using the filler (II), the mechanical strength, abrasion resistance, heat resistance, and weather resistance are improved, the hardness can be adjusted, and the amount of the rubber composition can be increased.

Examples of the filler (II) to be used in the present invention include: oxides, such as silica and titanium oxide; silicates, such as clay, talc, mica, glass fibers, and glass balloons; carbonates, such as calcium carbonate and magnesium carbonate; hydroxides, such as magnesium hydroxide and aluminum hydroxide; sulfates, such as calcium sulfate and barium sulfate; inorganic fillers, such as, carbons, for example, carbon blacks and carbon fibers; and organic fillers, such as resin particles, wood flour, and powdered cork. One of such fillers may be used alone or two or more thereof may be used in combination.

The content of the filler (II) in the rubber composition is preferably 25 to 130 parts by mass relative to 100 parts by mass of the rubber component (I), and more preferably 30 to 110 parts by mass. When the content of the filler (II) is within the above range, the moldability, mechanical strength, abrasion resistance, and braking performance are enhanced.

The filler (II) is, from the viewpoint of the rolling resistance performance and ice grip performance, preferably an inorganic filler, more preferably one or more selected from silicas and carbon blacks, further preferably a silica. A silica and a carbon black may be used in combination.

(Silica)

Examples of silicas include dried silica (silicic anhydride), wet silica (silicic anhydride), calcium silicate, and aluminum silicate. From the viewpoint of enhancing the moldability, mechanical strength, abrasion resistance, and braking performance, wet silica is preferred. One of such silicas may be used alone or two or more thereof may be used in combination.

The mean particle size of the silica is, from the viewpoint of increasing the moldability, mechanical strength, abrasion resistance, and braking performance, preferably 0.5 to 200 nm, more preferably 5 to 150 nm, further preferably 10 to 100 nm, and furthermore preferably 10 to 60 nm.

Note that the mean particle size of the silica can be determined by measuring the diameter of particles by a transmission electron microscope and calculating the average value thereof.

(Carbon Black)

As the carbon black, for example, furnace black, channel black, thermal black, acetylene black, Ketjen black, and other carbon blacks can be used. Among them, from the viewpoint of enhancing the vulcanization rate of the rubber composition or the mechanical strength of the vulcanized product, furnace black is preferred. One of such carbon blacks may be used alone or two or more thereof may be used in combination.

Examples of commercially available furnace blacks include "DIABLACK" manufactured by Mitsubishi Chemical Corporation and "SEAST" manufactured by Tokai Carbon Co., Ltd. An example of a commercially available acetylene black is "DENKA BLACK" manufactured by Denka Company Limited. An example of a commercially available Ketjen black is "KETJENBLACK ECP600JD" manufactured by Lion Corporation.

From the viewpoint of enhancing the wettability to and dispersibility into the rubber component (I), the carbon black may be subjected to an acid treatment with nitric acid, sulfuric acid, hydrochloric acid, a mixed acid thereof, or the like, or a surface oxidation treatment by a heat treatment in the presence of the air. From the viewpoint of enhancing the mechanical strength, the carbon black may be subjected to a heat treatment at 2,000 to 3,000° C. in the presence of a graphitized catalyst. As the graphitized catalyst, boron, boron oxide (for example, $B_2O_2$, $B_2O_3$, $B_4O_3$, $B_4O_5$, etc.), oxo acid of boron (for example, orthoboric acid, metaboric acid, tetraboric acid, etc.) and salts thereof, boron carbide (for example, $B_4C$, $B_6C$, etc.), boron nitride (BN), and other boron compounds can be suitably used.

The mean particle size of the carbon black can be adjusted by pulverization or the like. In pulverization of the carbon black, a high speed rotary pulverizer (hammer mill, pin mill, cage mil), various types of ball mills (tumbling mill, vibrating mill, planet mill), a stirring mill (bead mill, attritor, flow tube mill, annular mill), or the like can be used.

The mean particle size of the carbon black is, from the viewpoint of enhancing the dispersibility of the carbon black, and the mechanical strength and abrasion resistance of the tire, preferably 5 to 100 nm, more preferably 5 to 80 nm, and further preferably 10 to 70 nm.

The mean particle size of the carbon black can be determined by measuring the diameters of particles by a transmission electron microscope and calculating the average thereof.

In the rubber composition of the present invention, when a silica and a carbon black are used in combination, the blending ratio of the components is not particularly limited, and can be appropriately selected depending on the desired performance.

The rubber composition of the present invention may further contain a filler other than either silicas or carbon blacks as needed for the purpose of enhancing the mechanical strength and abrasion resistance, improving physical properties, such as the heat resistance and weather resistance, adjusting the hardness, and improving the economy through incorporation of an extender.

When the rubber composition of the present invention contains a filler other than either silicas or carbon blacks, the content thereof is preferably 0.1 to 120 parts by mass relative to 100 parts by mass of the rubber component (I), more preferably 5 to 90 parts by mass, and further preferably 10 to 80 parts by mass. When the content of the filler other than either silicas or carbon blacks is within the above range, the mechanical strength of the vulcanized product is further enhanced.

<Optional Components>

(Silane Coupling Agent)

The rubber composition of the present invention preferably contains a silane coupling agent. Examples of the silane coupling agent include sulfide compounds, mercapto compounds, thioester compounds, vinyl compounds, amino compounds, glycidoxy compounds, nitro compounds, and chloro compounds.

Examples of sulfide compounds include bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, and 3-trimethoxysilylpropylmethacrylate monosulfide.

Examples of mercapto compounds include 3-mercaptopropyltrimethoxysilane, 3-mercaptopropyltriethoxysilane, 3-mercaptopropyl-di(tridecan-1-oxy-13-penta(ethylene oxide))ethoxysilane, 2-mercaptoethyltrimethoxysilane, and 2-mercaptoethyltriethoxysilane.

Examples of thioester compounds include 3-hexanoylthiopropyltriethoxysilane, 3-octanoylthiopropyltriethoxysilane, 3-decanoylthiopropylethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, and 2-lauroylthioethyltrimethoxysilane.

Examples of vinyl compounds include vinyltriethoxysilane and vinyltrimethoxysilane.

Examples of amino compounds include 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane.

Examples of glycidoxy compounds include γ-glycidoxypropyltriethoxysilane, γ-glycidoxypropyltrimethoxysilane, γ-glycidoxypropylmethyldiethoxysilane, and γ-glycidoxypropylmethyldimethoxysilane.

Examples of nitro compounds include 3-nitropropyltrimethoxysilane and 3-nitropropyltriethoxysilane.

Examples of chloro compounds include 3-chloropropyltrimethoxysilane, 3-chloropropyltriethoxysilane, 2-chloroethyltrimethoxysilane, and 2-chloroethyltriethoxysilane.

One of such compounds may be used alone or two or more thereof may be used in combination. Among them, from the viewpoints of the large effect of the addition and the cost, one or more selected from sulfide compounds and mercapto compounds are preferred, and one or more selected from bis(3-triethoxysilylpropyl)disulfide, bis(3-triethoxysilylpropyl)tetrasulfide, and 3-mercaptopropyltrimethoxysilane are more preferred.

When the silane coupling agent is contained, the content of the silane coupling agent is preferably 0.1 to 30 parts by mass relative to 100 parts by mass of the silica, more preferably 0.5 to 20 parts by mass, and further preferably 1 to 15 parts by mass. When the content of the silane coupling agent is within the above range, the dispersibility, coupling effect, reinforcement, and abrasion resistance of tires are enhanced.

(Crosslinking Agent)

The rubber composition of the present invention is preferably crosslinked (vulcanized) by addition of a crosslinking agent and then used. Examples of the crosslinking agent include sulfur and sulfur compounds, oxygen, organic peroxides, phenol resins, amino resins, quinone, quinone dioxime derivatives, halogen compounds, aldehyde compounds, alcohol compounds, epoxy compounds, metal halogenated products, organic metal halogenated products, and silane compounds other than the silane coupling agent. Among them, sulfur and sulfur compounds are preferred. One of such crosslinking agents may be used alone or two or more thereof may be used in combination. The content of the crosslinking agent is preferably 0.1 to 10 parts by mass relative to 100 parts by mass of the rubber component (I), more preferably 0.5 to 8 parts by mass, and further preferably 0.8 to 5 parts by mass.

When sulfur and sulfur compounds, among the crosslinking agents, are used, the rubber composition of the present invention can be vulcanized and used as a vulcanized rubber. The conditions and method of the vulcanization are not particularly limited, but vulcanization is preferably performed using a vulcanization die under pressurized and heated conditions at a vulcanization temperature of 120 to 200° C. and at a vulcanization pressure of 0.5 to 2.0 MPa.

The rubber composition of the present invention may contain a vulcanization accelerator. Examples of the vulcanization accelerator include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds, and xanthate compounds. One of such vulcanization accelerators may be used alone or two or more thereof may be used in combination. When a vulcanization accelerator is contained, the content thereof is preferably 0.1 to 15 parts by mass relative to 100 parts by mass of the rubber component (I), and more preferably 0.1 to 10 parts by mass.

The rubber composition of the present invention may further contain a vulcanization aid. Examples of the vulcanization aid include a fatty acid, such as stearic acid; a metal oxide, such as zinc flower; and a fatty acid metal salt, such as zinc stearate. One of such vulcanization aids may be used alone or two or more thereof may be used in combination. When the vulcanization aid is contained, the content thereof is preferably 0.1 to 15 parts by mass relative to 100 parts by mass of the rubber component (I), and more preferably 1 to 10 parts by mass.

(Other Components)

In the rubber composition of the present invention, for the purpose of improving the moldability, flowability, and the like, a processed oil, such as a silicone oil, an aroma oil, a TDAE (treated distilled aromatic extract), an MES (mild extracted solvate), an RAE (residual aromatic extract), a paraffine oil, or a naphthene oil, a resin component, such as an aliphatic hydrocarbon resin, an alicyclic hydrocarbon resin, a C9 resin, a rosin resin, a coumarone-indene resin, or a phenol resin, a liquid polymer, such as a low molecular weight polybutadiene, a low molecular weight polyisoprene, a low molecular weight styrene butadiene copolymer, or a low molecular weight styrene isoprene copolymer, can be appropriately used, as needed, as a softening agent to the extent that the effects of the present invention are not impaired. The copolymer may be in any polymerization form, such as a block or random form. The weight average molecular weight of the liquid polymer is preferably 500 to 100,000 from the viewpoint of the moldability.

For the purpose of enhancing the weather resistance, heat resistance, and oxidation resistance, the rubber composition of the present invention may contain one or two or more additives, such as an aging retardant, an antioxidant, a wax, a lubricant, a light stabilizer, an antiscorching agent, a processing aid, a colorant, such as a pigment or dye, a frame retardant, an antistatic agent, a matting agent, an antiblocking agent, a UV absorber, a mold releasing agent, a foaming agent, an antibacterial agent, an antifungal agent, and a flavor, as needed, to the extent that the effects of the present invention are not impaired.

Examples of the antioxidant include hindered phenol compounds, phosphorus compounds, lactone compounds, and hydroxy compounds.

Examples of the aging retardant include amine-ketone compounds, imidazole compounds, amine compounds, phenol compounds, sulfur compounds, and phosphorus compounds.

The total content of the rubber component (I) and the filler (II) in the rubber composition of the present invention is, from the viewpoint of the rolling resistance performance and ice grip performance, preferably 50% by mass or more, more preferably 60% by mass or more, and further preferably 70% by mass or more.

(Method for Producing Rubber Composition)

The method for producing the rubber composition of the present invention is not particularly limited, and the components are simply uniformly mixed. Examples of the technique for uniform mixing include tangential or intermesh-type closed kneaders, such as a kneader ruder, a brabender, a bunbury mixer, and an internal mixer, single screw extruders, twin screw extruders, mixing rolls, and rollers. The mixing can be generally performed at a temperature in the range of 70 to 270° C.

[Tire]

The tire of the present invention is a tire in which the rubber composition is used in at least a part thereof. Thus, the tire is superior in the rolling resistance performance and the ice grip performance. The rubber composition of the present invention can be used in various parts of a tire, and in particular, can be suitably used as a tire tread for a passenger car, a truck, a bus, a motorcycle, or an industrial vehicle.

In the tire of the present invention, a crosslinked product obtained by crosslinking the rubber composition of the present invention may be used. A tire produced by using the rubber composition of the present invention or using a crosslinked product obtained from the rubber composition of the present invention can maintain properties, such as mechanical strength, abrasion resistance, rolling resistance performance, and ice grip performance even when used in a long period of time.

EXAMPLES

The present invention will be described in detail below with reference to examples, but the present invention is not to be limited to the examples.

Components used in Examples and Comparative Examples are as follows.

<Rubber Component (I)>

Block copolymers obtained in Examples 1-1 to 1-2 and Comparative Example 1-1

Butadiene rubber: BR01 (manufactured by JSR Corporation, high-cis type [1,4-cis bond 95%], weight average molecular weight: 520,000, Tg: −103° C.)

<Filler (II)>

[Silica]

ULTRASIL 7000GR (manufactured by Evonik Degussa Japan, wet silica, mean particle size: 14 nm)

[Carbon Black]

DIABLACK I (manufactured by Mitsubishi Chemical Corporation, mean particle size: 20 nm)

<Optional Components>

(Silane Coupling Agent)

Si 75 (manufactured by Evonik Degussa Japan)

(Crosslinking Agent)

Sulfur: fine powdered sulfur 200 mesh (manufactured by Tsurumi Chemical Industry Co., Ltd.)

(Vulcanization Accelerator)

Vulcanization accelerator (1): Nocceler NS (manufactured by Ouchi Shinko Chemical Industrial Co., Ltd.)

Vulcanization accelerator (2): Nocceler M (manufactured by Ouchi Shinko Chemical Industrial Co., Ltd.)

Vulcanization accelerator (3): Nocceler D (manufactured by Ouchi Shinko Chemical Industrial Co., Ltd.)

(Vulcanization Aid)

Zinc oxide: zinc oxide (manufactured by Sakai Chemical Industry Co., Ltd.)

Stearic acid: LUNAC S-20 (manufactured by Kao Corporation)

(Other Components)

TDAE: VivaTec 500 (manufactured by H&R)

Aging retardant: Nocrac 6C (manufactured by Ouchi Shinko Chemical Industrial Co., Ltd.)

Wax: SUNTIGHT S (manufactured by Seiko Chemical Co., Ltd.)

Production of Block Copolymer

Example 1-1

Into a pressure resistant vessel which is previously purged and dried with nitrogen were put 9,500 g of cyclohexane as a solvent and 3.5 g of a 10.5 mass % cyclohexane solution of sec-butyllithium (sec-butyllithium 0.37 g) as an organic metal initiator, and the temperature was raised to 70° C. Then, 15.1 g of tetrahydrofuran was put and a previously prepared mixed liquid of 518 g of styrene and 777 g of butadiene was added at 10 ml/minute, and the mixture was further polymerized for 30 minutes. Subsequently, 15.1 g of 6-farnesene was added and the mixture was further polymerized for 30 minutes, and then 0.08 g of tetraethoxysilane was added as a coupling agent to effect a reaction for 1 hour. To the resulting polymerization reaction liquid, 0.2 g of methanol was added to terminate the polymerization reaction, then 491 g of TDAE was added, and the mixture was dried under hot air at 70° C. for 24 hours and dried under reduced pressure for 12 hours, thereby producing an oil extended block copolymer 1.

Example 1-2

Into a pressure resistant vessel which is previously purged and dried with nitrogen were put 9,500 g of cyclohexane as a solvent and 5.0 g of a 10.5 mass % cyclohexane solution of sec-butyllithium (sec-butyllithium 0.53 g) as an organic metal initiator, and the temperature was raised to 70° C. Then, 15.1 g of tetrahydrofuran was put and 259 g of β-farnesene was added to effect polymerization for 30 minutes. Subsequently, a previously prepared mixed liquid of 402 g of styrene and 635 g of butadiene was added at 10 ml/minute, and the mixture was further polymerized for 30 minutes. Then, 9.3 g of butadiene was added and the mixture was further polymerized for 30 minutes, and 0.08 g of tetraethoxysilane was added as a coupling agent to effect a reaction for 1 hour. To the resulting polymerization reaction liquid, 0.3 g of methanol was added to terminate the polymerization reaction, then 489 g of TDAE was added, and the mixture was dried under hot air at 70° C. for 24 hours and dried under reduced pressure for 12 hours, thereby producing an oil extended block copolymer 2.

Comparative Example 1-1

Into a pressure resistant vessel which is previously purged and dried with nitrogen were put 9,460 g of cyclohexane as a solvent and 3.5 g of a 10.5 mass % cyclohexane solution of sec-butyllithium (sec-butyllithium 0.37 g) as an organic metal initiator, and the temperature was raised to 70° C. Then, 15.1 g of tetrahydrofuran was put, and a previously prepared mixed liquid of 516 g of styrene and 774 g of butadiene was further added at 10 ml/minute, and the mixture was further polymerized for 30 minutes. Subsequently, 9.0 g of butadiene was added and the mixture was further polymerized for 30 minutes, then 0.08 g of tetraethoxysilane was added as a coupling agent to effect a reaction for 1 hour. To the resulting polymerization reaction liquid, 0.2 g of methanol was added to terminate the polymerization reaction, then 487 g of TDAE was added, and the mixture was dried under hot air at 70° C. for 24 hours and dried under reduced pressure for 12 hours, thereby producing an oil extended block copolymer X1.

The block copolymers 1 to 2 and X1 produced in Examples 1-1 to 1-2 and Comparative Example 1-1 were evaluated according to the following methods. The results are shown in Table 1.

(Weight Average Molecular Weight)

The weight average molecular weight (Mw) was determined by GPC (gel permeation chromatography) based on standard polystyrenes. The measurement apparatus and conditions are as follows.

Apparatus: GPC apparatus "HLC-8320" manufactured by Tosoh Corporation

Separation column: "TSKgel Super HZM-M" manufactured by Tosoh Corporation

Eluent: tetrahydrofuran

Flow rate of eluent: 0.7 ml/minute

Sample concentration: 5 mg/10 ml

Column temperature: 40° C.

(Coupling Ratio)

The coupling ratio was calculated, based on an elution curve obtained by GPC (gel permeation chromatography) as described above of the obtained block copolymer, by dividing the area of the coupled block copolymer(s) (the area of a peak(s) on the high molecular weight side) by the sum of the area of the coupled block copolymer(s) and the area of the non-coupled block copolymer (the area of a peak on the low molecular weight side).

(Glass Transition Temperature)

To an aluminum pan, 10 mg of the block copolymer was taken. A thermogram thereof was measured by differential scanning calorimetry (DSC) under a condition at a temperature rising of 10° C./minute, and the value at the peak top of the differential curve (DDSC) was taken as the glass transition temperature.

(Mooney Viscosity)

According to JIS K 6300-1:2013, the Mooney viscosity of the block copolymer (oil extended product) at 100° C. (1 minute after previous heating, 4 minutes after rotation starting).

TABLE 1

|  |  | Example 1-1 Block copolymer 1 | Example 1-2 Block copolymer 2 | Comparative Example 1-1 Block copolymer X1 |
|---|---|---|---|---|
| Mass ratio of each block in block copolymer | Polymer block A | 1.2 | 19.8 | — |
|  | Copolymer block B | 98.8 | 79.4 | 99.3 |
|  | Polymer block C | — | 0.7 | 0.7 |
| Content of farnesene units (a1) in polymer block A (% by mass) |  | 100.0 | 100.0 | — |
| Content of aromatic vinyl compound units (b2) in copolymer block B (% by mass) |  | 40.0 | 38.8 | 40.0 |
| Mass ratio of polymer block A to copolymer block B (A/B) |  | 1.2/98.8 | 20/80 | — |
| Weight average molecular weight (Mw) | /1000 | 880 | 760 | 930 |
| Coupling ratio | % | 20 | 22 | 26 |
| Glass transition temperature (Tg) | ° C. | −29 | −29 | −31 |
| Mooney viscosity (oil extended product) | $ML_{1+4}$ (100° C.) | 84 | 30 | 90 |

Examples 2-1 to 2-3 and Comparative Example 2-1

According to the blending ratios (parts by mass) shown in Table 2, the rubber component (I), the filler (II), the silane coupling agent, the vulcanization aids, TDAE, the aging retardant, and the wax were put in a closed bunbury mixer, and the mixture was kneaded at an initial temperature of 75° C. for 6 minutes so that the resin temperature became 150° C., and then the kneaded mixture was taken out of the mixer and was cooled to room temperature to obtain a mixture (1). Next, the mixture (1) was put again to a closed bunbury mixer and was kneaded for 6 minutes so that the resin temperature became 150° C., and the kneaded mixture was taken out of the mixer and was cooled to room temperature to obtain a mixture (2). The mixture (2) was further put into a closed bunbury mixer, and after addition of the crosslinking agent (sulfur) and the vulcanization accelerators (1) to (3), the mixture was kneaded 75 seconds at an initial temperature of 50° C. so that the temperature reached 100° C., thereby obtaining a rubber composition.

The obtained rubber composition was subjected to press molding (pressing conditions: 160° C. and 15 minutes) to produce a sheet (vulcanized sheet) (thickness: 2 mm) of a crosslinked product (vulcanized rubber). According to the following method, the rolling resistance performance was evaluated.

In addition, a rubber composition obtained in the same manner was subjected to press molding (pressing conditions: 160° C., 25 minutes) for vulcanization to produce a vulcanized rubber sample having a tire shape with a diameter of 80 mm and a width of 16 mm. According to the following method, the ice grip performance was evaluated.

(Rolling Resistance Performance)

As an index of the rolling resistance performance, tan δ was measured.

A specimen having a length of 40 mm and a width of 7 mm was cut from the vulcanized sheet produced in Examples and Comparative Example, and using a dynamic viscoelasticity measuring apparatus manufactured by GABO, tan δ was measured under conditions of a measurement temperature of 60° C., a frequency of 10 Hz, a static strain of 10%, and a dynamic strain of 2%, and the reciprocal thereof was taken to evaluate the rolling resistance performance. The results are shown in Table 2.

In Table 2, the values of Examples were relative values to the value of Comparative Example 2-1 which was taken as 100, and a larger value indicates better rolling resistance performance.

(Ice Grip Performance)

As an index of the ice grip performance, the coefficient of friction on ice (μ) was evaluated.

The coefficients of friction on ice of the vulcanized rubber samples obtained in Examples and Comparative Example were measured using the following measurement apparatus. The measurement apparatus and the conditions were as follows.

The coefficients of friction were measured at slip ratios between a tire and a road surface in the range of 0 to 40%, and the maximum value of the measured coefficients of friction was taken as the coefficient of friction on ice (μ). The results are shown in Table 2.

In Table 2, the values of Examples were relative values to the value of Comparative Example 2-1 which was taken as 100, and a larger value indicates better ice grip performance.

[Measurement Apparatus and Measurement Conditions]

Apparatus: RTM Friction Tester, manufactured by Ueshima Seisakusho Co., Ltd.
Measurement temperature: −3.0° C.
Road surface: ice
Speed: 30 km/hour
Load: 50 N
Slip ratio: 0 to 40%

TABLE 2

|  |  |  | Example 2-1 | Example 2-2 | Example 2-3 | Comparative Example 2-1 |
|---|---|---|---|---|---|---|
| Blending ratio (parts by mass) | Rubber component (I) | Block copolymer 1 | 80 |  |  |  |
|  |  | Block copolymer 2 |  | 20 | 80 |  |
|  |  | Block copolymer X1 |  | 60 |  | 80 |
|  |  | Butadiene rubber | 20 | 20 | 20 | 20 |
|  | Filler (II) | Silica | 75 | 75 | 75 | 75 |
|  |  | Carbon black | 5 | 5 | 5 | 5 |
|  | Silane coupling agent |  | 6 | 6 | 6 | 6 |

TABLE 2-continued

|  |  |  | Example 2-1 | Example 2-2 | Example 2-3 | Comparative Example 2-1 |
|---|---|---|---|---|---|---|
|  | Crosslinking agent | Sulfur | 1.9 | 1.9 | 1.9 | 1.9 |
|  | Vulcanization accelerator (1) |  | 1.8 | 1.8 | 1.8 | 1.8 |
|  | Vulcanization accelerator (2) |  | 0.3 | 0.3 | 0.3 | 0.3 |
|  | Vulcanization accelerator (3) |  | 1.5 | 1.5 | 1.5 | 1.5 |
|  | Vulcanization aid | Zinc flower | 3 | 3 | 3 | 3 |
|  |  | Stearic acid | 2.5 | 2.5 | 2.5 | 2.5 |
|  | TDAE |  | 30 | 30 | 30 | 30 |
|  | Aging retardant |  | 2.5 | 2.5 | 2.5 | 2.5 |
|  | Wax |  | 2 | 2 | 2 | 2 |
| Evaluation | Rolling resistant performance (relative value) |  | 104 | 100 | 109 | 100 |
|  | Ice grip performance (relative value) |  | 111 | 121 | 136 | 100 |

It can be seen from Table 2 that the rubber compositions of Examples were superior in the rolling resistance performance and the ice grip performance as compared with that of Comparative Example.

(Wet Grip Performance)

As an index of the braking performance of a tire, the wet grip performance was further evaluated.

A specimen having a length of 40 mm and a width of 7 mm was cut from the vulcanized sheets produced in Example 2-1 and Comparative Example 2-1, and using a dynamic viscoelasticity measuring apparatus manufactured by GABO, tan δ was measured under conditions of a measurement temperature of 0° C., a frequency of 10 Hz, a static strain of 10%, and a dynamic strain of 2% to evaluate the wet grip performance. The results are shown in Table 3.

In Table 3, the value of Example 2-1 was a relative value to the value of Comparative Example 2-1 which was taken as 100. A larger relative value indicates better wet grip performance.

TABLE 3

|  |  |  | Example 2-1 | Comparative Example 2-1 |
|---|---|---|---|---|
| Blending ratio (parts by mass) | Rubber component (I) | Block copolymer 1 | 80 |  |
|  |  | Block copolymer X1 |  | 80 |
|  |  | Butadiene rubber | 20 | 20 |
|  | Filler (II) | Silica | 75 | 75 |
|  |  | Carbon black | 5 | 5 |
|  | Silane coupling agent |  | 6 | 6 |
|  | Crosslinking agent | Sulfur | 1.9 | 1.9 |
|  | Vulcanization accelerator (1) |  | 1.8 | 1.8 |
|  | Vulcanization accelerator (2) |  | 0.3 | 0.3 |
|  | Vulcanization accelerator (3) |  | 1.5 | 1.5 |
|  | Vulcanization aid | Zinc flower | 3 | 3 |
|  |  | Stearic acid | 2.5 | 2.5 |
|  | TDAE |  | 30 | 30 |
|  | Aging retardant |  | 2.5 | 2.5 |
|  | Wax |  | 2 | 2 |
| Evaluation | Wet grip performance (relative value) |  | 101 | 100 |

It can be seen from Table 3 that Example 2-1 increased the rolling resistance performance while maintaining the wet grip performance, while the rolling resistance performance and the wet grip performance are generally conflicting properties. Accordingly, it can be seen that Example 2-1 has good wet grip performance in addition to the rolling resistance performance and the ice grip performance, and thus is superior in the balance among the properties.

INDUSTRIAL APPLICABILITY

In the block copolymer of the present invention, the rolling resistance performance and the ice grip performance can be improved in a good balance, and therefore a rubber composition containing the block copolymer can be suitably used in a rubber composition, such as a tire.

The invention claimed is:

1. A block copolymer, comprising:
a polymer block A comprising a farnesene-derived monomer unit (a1); and
a random copolymer block comprising a C12 or lower conjugated diene-derived monomer unit (b1) and an aromatic vinyl compound-derived monomer unit (b2),
wherein the block copolymer has an A/B mass ratio of the polymer block A to the random copolymer block B in a range of from 30170 to 0.5/99.5,
wherein the block copolymer has a content of the aromatic vinyl compound-derived monomer unit (b2) in the random copolymer block B in a range of from 1 to 50% by mass,
wherein the block copolymer has a weight average molecular weight as determined by gel permeation chromatography based on polystyrene in a range of from 100,000 to 5,000,000,
wherein at least a part of the block copolymer is a block copolymer in which terminals of linear block copolymer chains are bonded to one another via a coupling agent, and
wherein the coupling ratio is 40% by mass or less.

2. The block copolymer of claim 1, having a content of the farnesene-derived monomer unit (a1) in the polymer block A of 60% by mass or more.

3. The block copolymer of claim 1, having a total content of the C12 or lower conjugated diene-derived monomer unit (b1) and the aromatic vinyl compound-derived monomer unit (b2) in the random copolymer block B of 60% by mass or more.

4. The block copolymer of claim 1, wherein the coupling ratio is in a range of from 1 to 40% by mass.

5. The block copolymer of claim 1, wherein at least a part of the block copolymer is a branched block copolymer in which terminals of linear block copolymer chains are bonded to one another via a coupling agent.

6. The block copolymer of claim 1, wherein the block copolymer has the polymer block A at a terminus of a molecular chain of the block copolymer.

7. A method for producing a block copolymer, the method comprising:
polymerizing a monomer comprising farnesene in the presence of an organic metal initiator to produce a living polymer comprising the polymer block A; and
polymerizing monomers comprising a C12 or lower conjugated diene and an aromatic vinyl compound in the presence of the living polymer comprising the polymer block A to produce a living block copolymer comprising the polymer block A and a random copolymer block B,
wherein the block copolymer comprises a polymer block A comprising a farnesene-derived monomer unit (a1) and the random copolymer block B comprising a C12 or lower conjugated diene-derived monomer unit (b1) and an aromatic vinyl compound-derived monomer unit (b2),
wherein at least a part of the block copolymer is a block copolymer in which terminals of linear block copolymer chains are bonded to one another via a coupling agent, and
wherein the coupling ratio is 40% by mass or less.

8. The method of claim 7, further comprising:
coupling at least a part of the living block copolymer comprising the polymer block A and the random copolymer block B with a coupling, agent.

9. A method for producing a block copolymer, the method comprising:
polymerizing monomers comprising a C12 or lower conjugated diene and an aromatic vinyl compound in the presence am organic metal initiator to produce a living polymer comprising a random copolymer block B; and
polymerizing a monomer comprising farnesene in the presence of the living polymer comprising the random copolymer block B to produce a living block copolymer comprising a polymer block A and the random copolymer block B,
wherein the block copolymer comprises the polymer block A comprising a farnesene-derived monomer unit (a1) and the random copolymer block B comprising a C12 or lower conjugated diene-derived monomer unit (b1) and an aromatic vinyl compound-derived monomer unit (b2),
wherein at least a part of the block copolymer is a block copolymer in which terminals of linear block copolymer chains are bonded to one another via a coupling agent, and
wherein the coupling, ratio is 40% by mass or less.

10. The method of claim 9, further comprising:
coupling at least a part of the living block copolymer comprising the polymer block A and the random copolymer block B with a coupling agent.

11. A rubber composition, comprising:
a rubber component (I) comprising the block copolymer of claim 1; and
a filler (II),
wherein the rubber composition has a content of the block copolymer in the total amount of the rubber component (I) in a range of from 0.1 to 99.9% by mass, and
wherein the rubber composition comprises the filler (II) in an amount in a range of from 20 to 150 parts by mass, relative to 100 parts by mass of the rubber component (I).

12. A tire, comprising,
the rubber composition of claim 11.

13. The block copolymer of claim 1, wherein the coupling ratio is in a range of from 1 to 30% by mass.

14. The block copolymer of claim 1, wherein the coupling ratio is in a range of from 5 to 28% by mass.

15. The block copolymer of claim 1, wherein the coup mg ratio is in a range of from 10 to 25% by mass.

16. The block copolymer of claim 1, wherein the A/B mass ratio of the block copolymer is in a range of from 23/73 to 0.7/99.3.

17. The block copolymer of claim 1, having a glass transition temperature in a range of from −90 to −10° C.

18. The block copolymer of claim 1, having a total content of the C12 or lower conjugated diene-derived monomer unit (b1) and the aromatic vinyl compound-derived monomer unit (b2) in the random copolymer block B in a range of from 80 to 100% by mass.

19. The block copolymer of claim 1, having a total content of the C12 or lower conjugated diene-derived monomer unit (b1) and the aromatic vinyl compound-derived monomer unit (b2) in the random copolymer block B in a range of from 90 to 100% by mass.

20. The block copolymer of claim 1, having a total content of the C12 lower conjugated diene-derived monomer unit (b1) and the aromatic vinyl compound-derived monomer unit (b2) in the random copolymer block B in a range of from 98 to 100% by mass.

* * * * *